Dec. 11, 1951     F. M. PARKER     2,578,315
DUST RECOVERY

Filed March 17, 1947     2 SHEETS—SHEET 1

INVENTOR
Frank M. Parker
BY
ATTORNEYS

Patented Dec. 11, 1951

2,578,315

UNITED STATES PATENT OFFICE 2,578,315

DUST RECOVERY

Frank M. Parker, Richmond, Calif., assignor to California Research Corporation, San Francisco, Calif., a corporation of Delaware Application March 17, 1947, Serial No. 735,136

10 Claims. (Cl. 183—21)

The present invention relates to an improved method of recovering dust fines formed in the processing of chemical materials. More particularly, it relates to a method of recovering dust fines of hygroscopic materials, and especially dust fines produced in the course of spray-drying of surface-active compounds, such as synthetic detergents, wetting agents and soaps.

The term "spray-drying," as used in this description, applies to processes by which solids are recovered from their liquid solutions or slurries by spraying the liquid into a stream of drying gas or air under conditions which permit recovery of a dry granular product. A conventional spray-drying installation essentially consists of a drying chamber or drier, a spraying mechanism to effect the contact between the liquid and the stream of a drying gas, a pump and piping for conveying the liquid to the chamber, a fan, conduits and heater for supplying the drying gas or air, and a means for collecting the dried product. The bulk of the dried product is usually collected at the bottom of the drying chamber, but a substantial portion is carried off in the form of fine dust by the drying gas into a collecting unit such as a cyclone or some other type of dust-catcher.

However, in nearly all spray-drying operations it has been almost impossible to recover all of the air-float material which is present as a fine dust in the drying gas, so that a considerable dust nuisance is created in the atmosphere surrounding the gas or air exhaust of even the most efficient dust-collecting unit or cyclone, with correspondingly considerable product losses. Attempts to reduce this nuisance and to improve the collection efficiency by increasing the fan or blower horsepower are found to be only partially effective and entirely uneconomical, higher collection efficiency being obtained only at the expense of an increased pressure drop across the collecting system, and consequently resulting in unduly high power costs.

No satisfactory solution of the dust recovery problem is offered by the use of bag or fabric filters, because this use is too frequently limited by the effect of the relatively high temperature of the exhaust gas or air on the life of the fabric, and, in case of a hygroscopic dust, because of the tendency of such bags and filters to become clogged with the product which cakes as a result of its hygroscopicity or of moisture condensing from the surrounding air.

Likewise, the methods which resort to passing the dust-laden gas or air through a spray of water, either at the inlet or at the exhaust of the collecting unit, are far from being satisfactory. In either case, the water spray is incapable of catching all the dust.

It is in the spray-processing of valuable surface-active materials, such as synthetic detergents and soaps, that the excessive formation of dust fines, in the absence of effective methods for the recovery thereof, becomes particularly annoying and wasteful. Various methods for preventing this waste of valuable dust fines have been proposed. Thus, water-spray in the form of a fine mist has been introduced into the stream of drying gas or air which contained the dust fines. In other instances, steam has been used in lieu of water-spray. However, neither of these two methods eliminated the dust nuisance and prevented the waste of valuable materials, for the forces tending to bring about the fall of the humidified dust particles by gravity are smaller than the forces which tend to carry them away in the effluent gas or air. Moreover, the use of water-spray introduced the additional handicap of foaming.

Another approach toward solving the dust recovery problem consisted in spraying the interior of the collecting unit or cyclone with water, or yet in wetting the walls of such a unit with a continuous stream of water, so as to cause the agglomeration of the dust fines and their descent to the bottom of the collecting unit. Although some improvement in the collection efficiency was achieved thereby, considerable dust nuisance persisted at the exhaust of the collecting unit or cyclone. Furthermore, these last mentioned methods usually required an elaborate and complicated system of baffles, splash plates and other structures within the collecting unit for the purpose of assuring a good contact between the dust-laden gas and water and bringing down the dust.

The present invention provides a new and effective method of appreciably reducing the dust nuisance and the consequent waste of materials, as compared with the heretofore known methods, by injecting steam into the stream of drying gas or air prior to its admission into a collecting unit, and by subsequently impinging the steam-laden gas stream against the walls of, or a solid member or plate in the collecting unit or cyclone, wetted with a continuously flowing stream of a liquid, e. g., water, or preferably of a slurry of product to be spray-dried.

By effecting the injection of steam into the dust-laden stream of gas or air prior to its admission into the collecting unit or cyclone, a sufficiently long contact of the dust particles with steam is obtained, bringing about an increase in the density and/or size of the dust particles by reason of substantial humidification and agglomeration thereof, without occasioning foaming. However, as pointed out hereinbefore, this humidification is not sufficient to cause the dust particles to fall to the bottom of the collecting unit by gravity alone. In accordance with the present invention, this difficulty is remedied by providing a continuous aqueous stream along the interior walls of the collecting unit or cyclone.

The moisture-laden dust particles in the gas stream are impinged, i. e., projected by centrifugal force, against the walls of the collecting unit, traversed and wetted by a continuous downward flow of the aforementioned aqueous stream, pass into this stream by virtue of their increased density, owing to the preliminary humidification and/or agglomeration by steam, and are carried away in the aqueous stream to be reprocessed by spray-drying. Either water alone, or yet preferably a slurry of the product to be spray-dried, may be used to provide a continuous stream along the walls of the collecting unit or cyclone. In either case, the dust collection efficiency is greatly increased, the humidified dust particles being retained and entrained by the aqueous stream running down along the walls of the unit.

A particularly advantageous operation is secured by the use of the product slurry.

The use of this slurry prevents the sticking of the dust particles to the walls and insures a continuous operation by collecting the dust in a form which can be readily recycled to the spray-drier for immediate reprocessing, free of the commonly encountered difficulties in handling and losses. Moreover, the use of slurry effects a considerable economy of water. Additionally, the use of slurry places a lower evaporation duty on the spray driers during the ultimate recovery of the product.

Although steam alone is adequate to effect the necessary humidification and/or agglomeration of the dust particles, it is preferred to inject steam in conjunction with water in an amount sufficient to secure a minimum desired water content in the outgoing slurry, in order to facilitate removal of the collected product and recycling of a portion of the collected slurry to the top of the collecting unit or cyclone.

While an aqueous stream is ordinarily preferred, other liquids, for instance, alcohol, capable of dissolving or of forming a slurry of the product being processed may be used to create a continuously flowing stream along the walls of the collecting unit, whenever this use is warranted by the particular nature of the product.

The fundamental details of the process, and of the apparatus used in practicing the same, will be apparent from the description of the attached drawings of the preferred embodiment of the present invention.

Referring to the drawing.

Figure 1:
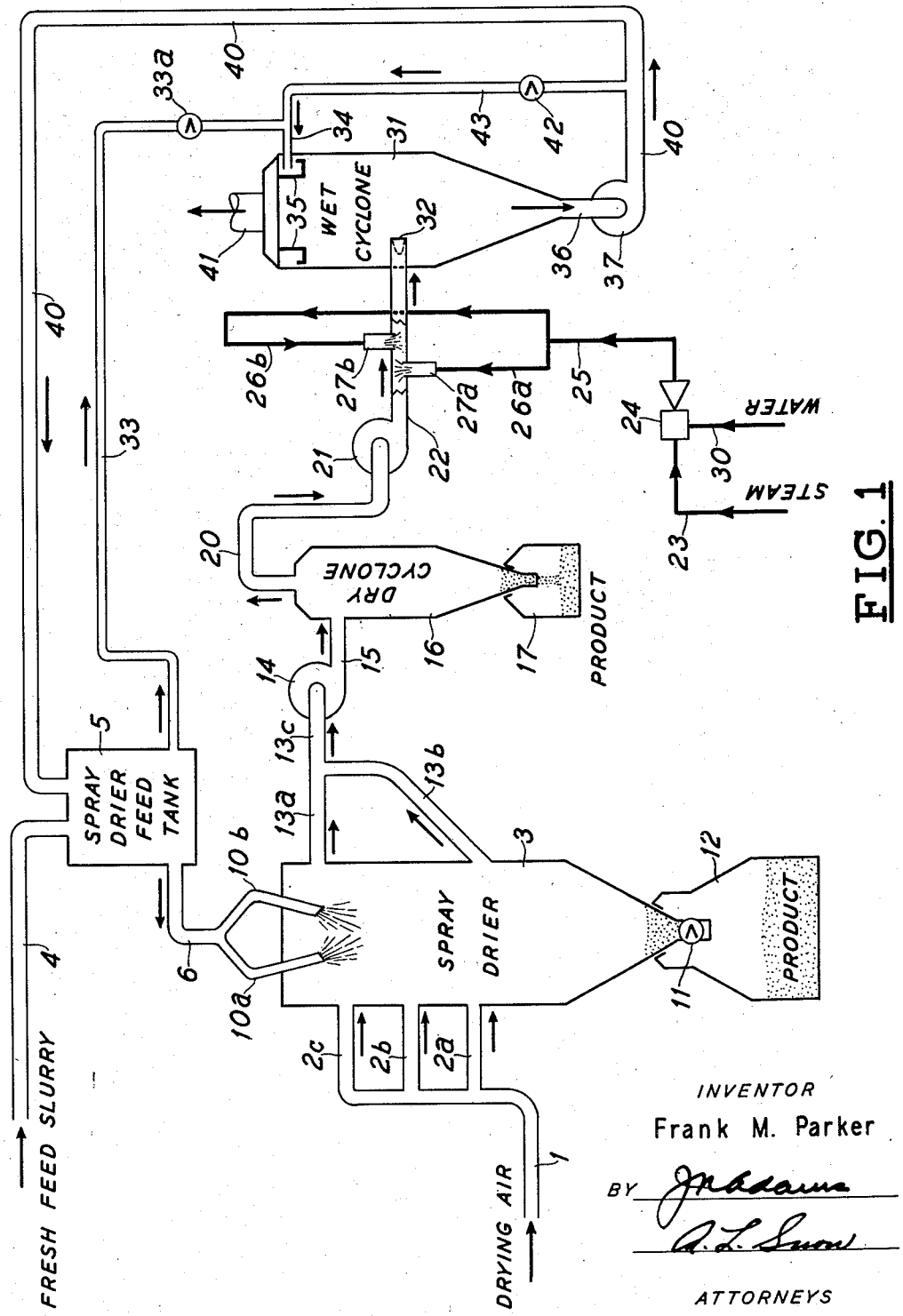
Figure 1 is a diagrammatic view illustrating a typical spray-drying installation comprising the new combination of steam-injection with a wetted-wall cyclone.

Referring to Fig. 1, the drying gas arrives through conduit 1 and branch conduits 2a, 2b and 2c into spray drier 3 at a temperature required for the effective spray-drying of the particular product, which, in its turn, is fed as a slurry through line 4 into spray-drier feed tank 5, and thence through line 6 to be atomized by spray nozzles 10a and 10b into spray-drier 3. There it is contacted with the drying gas and falls down in the form of dry, solid or hollow particles or granules to be discharged through the bottom of the spray-drier provided with a discharge valve into product receiver chamber 12.

The drying gas containing considerable air-float material is exhausted through ducts 13a, 13b and 13c into blower 14, whence it is sent through duct 15 into a conventional dry cyclone 16. Here the heavier particles of the entrained air-float material descend into another product receiver chamber 17, while the drying gas is exhausted through line or duct 20. If the product recovery were to terminate at this point, the gas exhausted from duct 20 into the atmosphere still would indicate the presence of a considerable amount of extremely fine dust. As mentioned before, this is both a nuisance and a waste. Therefore, instead of being allowed to escape into the surrounding atmosphere, the gas from duct 20 is sent into a second blower 21, and thence into a conduit 22. There, in accordance with the invention, steam is injected into conduit 22 by way of line 23, injector 24, line 25, lines 26a and 26b and steam nozzles 27a and 27b. Some appropriate means for drying the steam, such as a knock-out drum (not shown in the drawing) is provided upon steam line 23 to insure the supply of substantially dry (100%) steam, if so desired, while water in an amount sufficient to maintain the water content of the slurry at the desired level may be admixed from line 30 into injector 24.

In dispersing steam and water through nozzles at two or more points, as shown at 27a and 27b, into drying gas conduit 22 between blower 21 and wet cyclone 31, a good contact must be insured between the steam and the drying gas to secure complete humidification and/or agglomeration of the dust fines. Humidified gas is now entered under blast into cyclone 31 through inlet nozzle 32 and the centrifugal action of the whirling gas stream impinges the humidified and/or agglomerated dust particles against the walls of the cyclone wetted by the slurry of the product being spray-dried, which is admitted through valve-controlled line 33 and line 34 from spray-drier feed tank 5. The increased effective density of the dust particles and their humidified state cause these impinging particles to be substantially completely taken up by and into the flowing stream. A horizontal weir 35 above inlet nozzle 32, or some other appropriate spraying means, provides for the uniform distribution of the slurry throughout the cyclone. The agglomerated dust particles flow down with the slurry and are removed through outlet 36, pump 37 and line 40 to feed tank 5 and thence to be reprocessed by spray-drying. The drying gas is exhausted through outlet 41 into the atmosphere. Once the unit is placed in operation, no fresh slurry will be required, for the wetting of the walls will then be effected by recycling a portion of the product slurry through valve 42 and lines 43 and 34 onto weir 35, after closing the valve 33a controlling supply of fresh slurry from tank 5.

Figure 2:
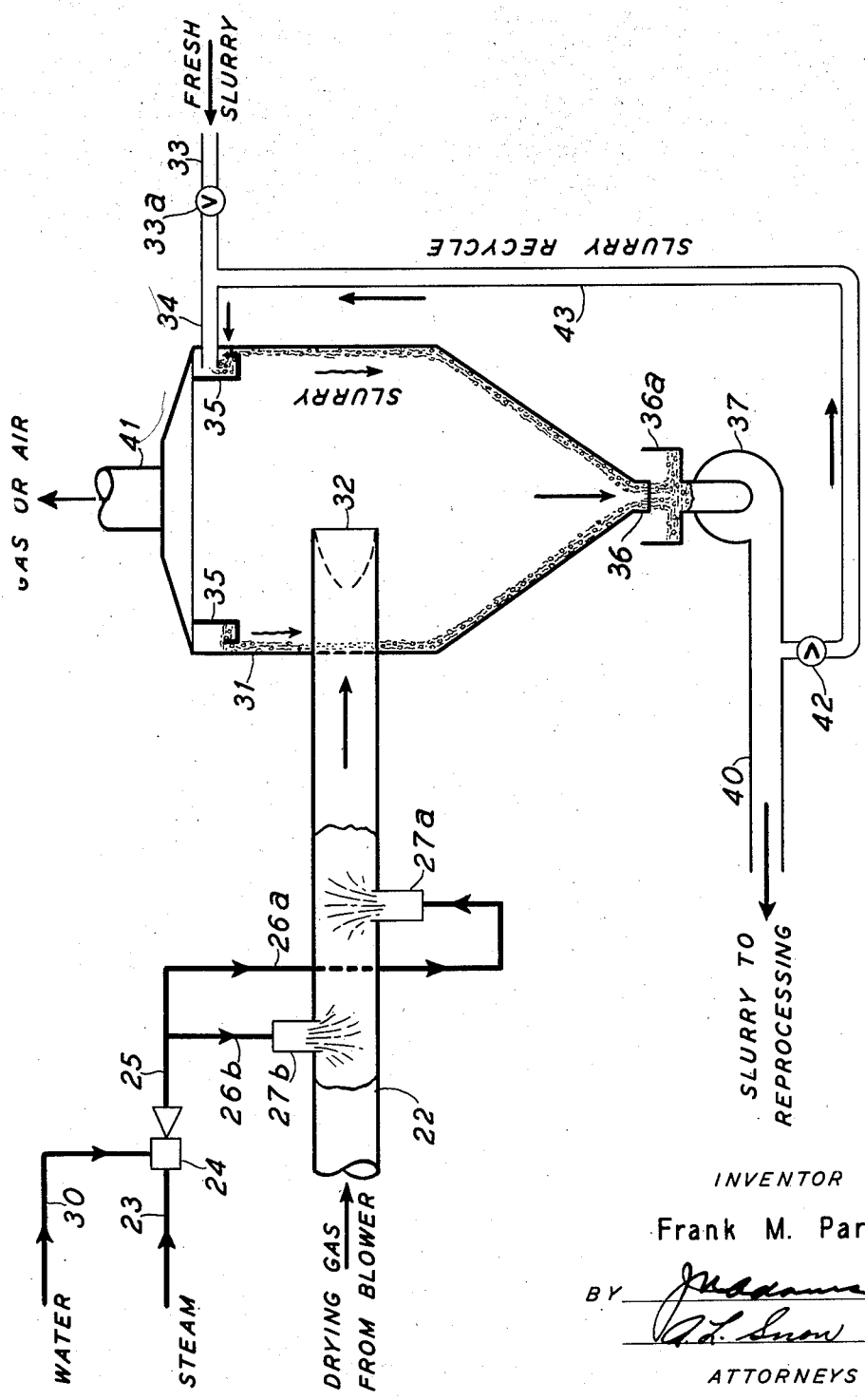
Figure 2 is a detail view of the improved dust collecting system of the present invention illustrating the path traveled by the drying gas, the admission of steam and water, and particularly the flow of the product slurry into, within and out of the cyclone.

As shown in Fig. 2, upon commencing the dust recovery operation, fresh product slurry from spray-drier feed tank 5 is admitted into wet cyclone 31 through valve-controlled line 33 and line 34. The slurry fills up weir 35, overruns it and flows down the sides of the cyclone, thus providing a uniform wetting of the cyclone walls. The humidified and agglomerated dust particles from the drying gas stream impinge upon, pass into and proceed downward with the slurry. The presence of water in the gas serves to maintain the water content of the slurry at the desired level.

The slurry is discharged preferably through outlet 36 into an open receiver pan or funnel 36a and is sent by pump 37 into line 40, and thence to eventual reprocessing. After the operation has begun, the admission of fresh slurry from spray-drier feed tank is discontinued by closing valve 33a, and a portion of the effluent slurry is diverted from line 40 through valve 42 into line 43 and recycled to the top of cyclone 31 to effect continuous wetting of its walls.

The utility of the present invention and the particular advantages derived therefrom are illustrated by the following experimental spray-drying system, the material to be spray-dried being an alkyl benzene sulfonate synthetic detergent composition, in which the alkyl chains of the benzene sulfonate contained from 9 to 18, and preferably from 12 to 15 carbon atoms. The spray-drying was effected by using air as the drying medium. The air was supplied to the spray-drier at a temperature of about 350° F., while the outlet temperature of the air at the exhaust of the primary collecting unit (dry cyclone) was brought down to about 110° F. by "quenching" with cold air. Although the operation may be carried out with outlet air temperatures ranging from about 60° F. to about 200° F., the outlet temperature of about 110° F. was selected, because it prevented caking and sticking tendencies exhibited by the detergent when processed in the particular spray-drying equipment at higher temperatures. Furthermore, outlet air temperatures higher than 110° F. increased the quantity of steam required to saturate the air stream in the dust removal stage. The air was supplied from the primary dry cyclone at a rate of 48,000 cub. ft./min. Steam of 100% quality (a knock-out drum was provided on the steam line) and 15 p. s. i. g. pressure was supplied to the injector at a rate of 8,000 to 18,000 lb./hr., the rate of water supply being from 0 to 1,000 lb./hr. The wet cyclone was operated at a temperature of about 125° F., and the maximum rate of slurry recycle was equal to about 10 gal./min. corresponding to about 0.12 gal./min./ft. of upper cyclone circumference. Under the particular operating conditions, the maximum feed rate of collected slurry from the wet cyclone to the spray-drier feed tank was about 3 gal./min.

At this point it must be emphasized that the novel principle of the invention resides in the combination of steam injection to humidify the air stream and the dust particles carried therein prior to admission into the cyclone and wetting of the walls of this latter with a stream of the slurry of the product being processed. The invention is by no means limited by the specific example of the recovery of alkyl benzene sulfonate dust given hereinbefore and the numerical data disclosed therein, nor by the particular design or dimensions of the equipment for the realization of the effective dust recovery in accordance with the inventive concept thereof.

The operating conditions, temperatures, feed rates, size of equipment and other details thereof will be readily ascertained by those skilled in the art for each particular material to be spray-processed. It is to be understood that the use of a primary collecting unit or dry cyclone is only one preferred embodiment of the operation in accordance with the invention, but that the process may also be operated with the steam injection and wet cyclone immediately following the spray drier. Likewise, the use of two blowers for effecting the passage of drying gas or air from the spray-drier to the dry cyclone, and thence to the wet cyclone, is wholly optional and a single blower may be sufficient to operate both cyclones. Nor is it mandatory to collect the bulk of the product into the receiver tank immediately underneath the spray drier and to exhaust the dust fines into the primary dry cyclone. If desired, and whenever the nature of the product permits it, the whole output of spray-drying may be exhausted into the dry cyclone, whence the bulk is discharged into a corresponding receiver tank, while the dust fines are sent to be steam-treated and recovered in accordance with the invention.

While the operating temperatures vary in accordance with the product being processed and the size and material of the equipment, higher temperatures of the drying gas or air stream tend to require more steam for their saturation. Again, while it is not always necessary to saturate the drying gas or air with steam, oversaturation with steam is preferred to cause its condensation on the dust and thus to obtain higher effective density of dust particles and better dust collection efficiency.

In the recovery of dust fines of alkyl benzene sulfonate detergent, water was admitted simultaneously with steam at a rate sufficient to maintain the water content of the ultimately collected slurry at from about 30 to about 50% by weight of the solids, the value of 50% by weight being preferred. In this particular instance, as well as in other applications of the present invention allowing the use of a minimum amount of water, its presence facilitates handling of the product slurry, while avoiding an excessive water consumption and too high an evaporation duty on the spray driers.

A spray-drying system provided with a single dry cyclone and used to recover an alkyl benzene sulfonate detergent composition was found to possess a mere 50% collection efficiency. The exhaust of the cyclone showed the presence of dust as a small cloud which tended to irritate mucous membranes upon breathing and caused sneezing.

When preliminary steam injection only was applied to the gas stream before its admission into the dry cyclone, the finer dust was not removed and the collection efficiency was found to have been increased only to about 70-80%. The dust cloud and irritation upon breathing near the exhaust of the dry cyclone persisted. In another test run, steam injection has been omitted, and the walls of the cyclone were wetted with water. A similar improvement in the collection efficiency estimated to be about 70-80% was observed, but again finer particles were not removed and the dust cloud at the exhaust of the cyclone persisted.

On the other hand, when the combination of steam injection and wet cyclone was used, the collection efficiency was so much improved for a pressure drop in the cyclone of only about 1", that the fine dust cloud disappeared altogether, and substantially no irritation was experienced on breathing the air near the exhaust of the wet cyclone. Thus, the combination reached and removed fine dust that either expedient alone did not touch.

The apparatus required by the present invention for the effective recovery of dust fines is remarkable in its simplicity. The wetted-wall collecting unit may consist of a cyclone of a most elementary design, operated at low pressure, and does not require the presence of complicated internal structures, baffles, splash plates and the like. This results in a substantial reduction of constructional and operating costs.

The invention provides a new, effective and economical method for the continuous recovery of dust fines contained in the drying gas or air from spray-drying processes, which increases substantially the dust collection efficiency, suppresses dust nuisance and effects an important economy of water and power.

The invention has been described hereinbefore in connection with the recovery of dust fines of an alkyl benzene sulfonate composition wherein the sulfonate contains alkyl chains of 12 to 15 carbon atoms. However, the application of this invention is in no event limited to the aforementioned compositions, and the invention is applicable to the recovery of a wide variety of industrial dust of economic value, provided it may be contacted with steam. In fact, the new combination of steam injection with a wetted-wall collecting unit or cyclone may be effectively used with processes other than spray-drying, whenever these processes are accompanied by the formation and attendant nuisance of fine dust.

In conclusion, it is to be understood that the above description of the new method of dust recovery and of the apparatus therefor is by no means limited to the specific embodiments disclosed therein, but embraces in its scope all variations and modifications of said method and apparatus, so long as they disclose the novel combination claimed hereinafter of injecting steam into the dust-containing gas or air stream with wetting of the walls of a collecting unit or cyclone with a slurry of the product being spray-processed.

I claim:

1. In the process for the recovery of dust fines of an alkyl benzene sulfonate composition by humidifying a stream of gas containing said dust fines with steam, and subsequently impinging said-treated gas against the interior walls of an unobstructed collecting unit, whereupon said dust fines are carried away by a slurry of said alkyl benzene sulfonate composition running down along said interior walls, the step of injecting water simultaneously with steam in an amount sufficient to maintain the water content of said slurry of alkyl benzene sulfonate composition between about 30% and about 50% by weight of the solids.

2. An apparatus for the recovery of surface-active dust fines formed in the spray-drying of surface-active chemical compounds from a drying gas containing said dust fines, said apparatus comprising a blower for directing the stream of dust-laden drying gas into a conduit; a means for injecting steam into said conduit to effect humidification and agglomeration of surface-active dust particles in the gas; an unobstructed collecting unit provided with an inlet for the gas from said conduit; a means for maintaining a continuous downflow of a slurry of said surface-active compound along the interior walls of said unit; an outlet for said slurry and the agglomerated dust particles of said surface-active compound entrained from the gas by the slurry; and an outlet for the gas freed from dust particles.

3. An apparatus as described in claim 2, wherein said unobstructed collecting unit is an unobstructed cyclone.

4. An apparatus for the recovery of surface-active dust formed in the spray-drying of surface-active chemical compounds from a drying gas containing said dust, which comprises a blower for evacuating the dust-laden drying gas from the spray-drying unit; a conduit for said gas; a means for injecting steam into said conduit to effect humidification and agglomeration of the dust particles in the gas; an unobstructed collecting unit provided with an inlet for the gas from said conduit; a means for continuously wetting the interior walls of said unit with a slurry of said chemical compound; an outlet for said slurry and the agglomerated dust particles entrained thereby at the bottom of the unit; an outlet for the gas freed from dust particles; and a means for recycling said slurry to the top of the collecting unit to effect continuous wetting of its interior walls.

5. An apparatus as described in claim 4, wherein said unobstructed collecting unit is a cyclone.

6. A continuous process for spray-drying an aqueous slurry of a surface-active material which comprises spraying a portion of said slurry into a drying chamber; passing a hot drying gas into said chamber; withdrawing dry solid particles of surface-active material from the lower portion of the drying chamber; withdrawing the drying gas containing evaporated water and suspended finely-divided particles of surface-active material from an intermediate point of the drying chamber; injecting steam into the stream of withdrawn drying gas to humidify and agglomerate the dust particles of surface-active material suspended therein; introducing the withdrawn drying gas containing humidified and agglomerated surface-active dust particles into a separating zone and impinging said gas against the interior surface of said separating zone; flowing a portion of said slurry of surface-active material over said interior surface of said separating zone to take up finely-divided particles of surface-active material; withdrawing the gas substantially freed from said finely-divided particles of surface-active material from the upper portion of the separating zone; withdrawing the slurry containing the recovered finely-divided particles of surface-active material from the lower portion of the separating zone; and spraying at least a substantial portion of the withdrawn slurry into the drying chamber.

7. A continuous process as defined in claim 6, wherein the surface-active material processed is an alkyl benzene sulfonate.

8. A method for the recovery of dust fines present in the stream of exhausted drying gas from the spray-drying treatment of hygroscopic, surface-active materials, which comprises: injecting steam into said stream of exhausted drying gas containing dust fines of hygroscopic, surface-active compounds to cause humidification and agglomeration of said dust fines; introducing said gas stream carrying in suspension the humidified and agglomerated dust fines of said hygroscopic, surface-active compounds into a collecting zone;

and impinging said gas stream against a surface situated within said zone and traversed by a downflowing stream of an aqueous slurry of said hygroscopic, surface-active compounds.

9. A method for the recovery of dust fines of an alkyl benzene sulfonate composition present in the stream of exhausted drying air from the spray-drying treatment of said composition, which comprises: injecting steam into said stream of exhausted drying air which has a temperature from 60 to 200° F. to cause humidification and agglomeration of alkyl benzene sulfonate dust fines contained therein; introducing said air stream carrying in suspension the humidified and agglomerated alkyl benzene sulfonate dust fines into a collecting zone; and impinging said gas stream against a surface situated within said zone and traversed by a downflowing stream of an aqueous slurry of said alkyl benzene sulfonate composition.

10. A method for the recovery of dust fines present in the stream of exhausted drying gas from the spray-drying treatment of hygroscopic, surface-active materials, which comprises injecting steam and water into said stream of exhausted drying gas containing dust fines of hygroscopic, surface-active compounds to cause humidification and agglomeration of said dust fines; introducing said gas stream carrying in suspension the humidified and agglomerated dust fines into a collecting zone; and impinging said gas stream against a surface situated within said zone and traversed by a downflowing stream of an aqueous slurry of said hygroscopic, surface-active compounds.

FRANK M. PARKER.

REFERENCES CITED

The following references are of record in the file of this patent:

UNITED STATES PATENTS

| Number | Name | Date |
| --- | --- | --- |
| 467,264 | Raymond | Jan. 19, 1892 |
| 585,604 | Twombly | June 29, 1897 |
| 723,531 | Jackson | Mar. 24, 1903 |
| 943,422 | Knoeppel | Dec. 14, 1909 |
| 1,176,747 | Ferguson | Mar. 28, 1916 |
| 1,366,712 | Brindle et al. | Jan. 25, 1921 |
| 1,734,677 | Kreisinger | Nov. 5, 1929 |
| 1,999,589 | Frey | Apr. 30, 1935 |
| 2,193,786 | Thurman | Mar. 12, 1940 |
| 2,321,893 | Bimpson et al. | June 15, 1943 |

FOREIGN PATENTS

| Number | Country | Date |
| --- | --- | --- |
| 427,351 | Great Britain | Apr. 23, 1935 |
| 629,193 | France | July 19, 1927 |
| 788,115 | France | July 22, 1935 |